(No Model.) 9 Sheets—Sheet 1.
J. H. GOODBAR.
COMBINED WRAPPING AND SIZING MACHINE FOR ORANGES, &c.
No. 553,559. Patented Jan. 28, 1896.
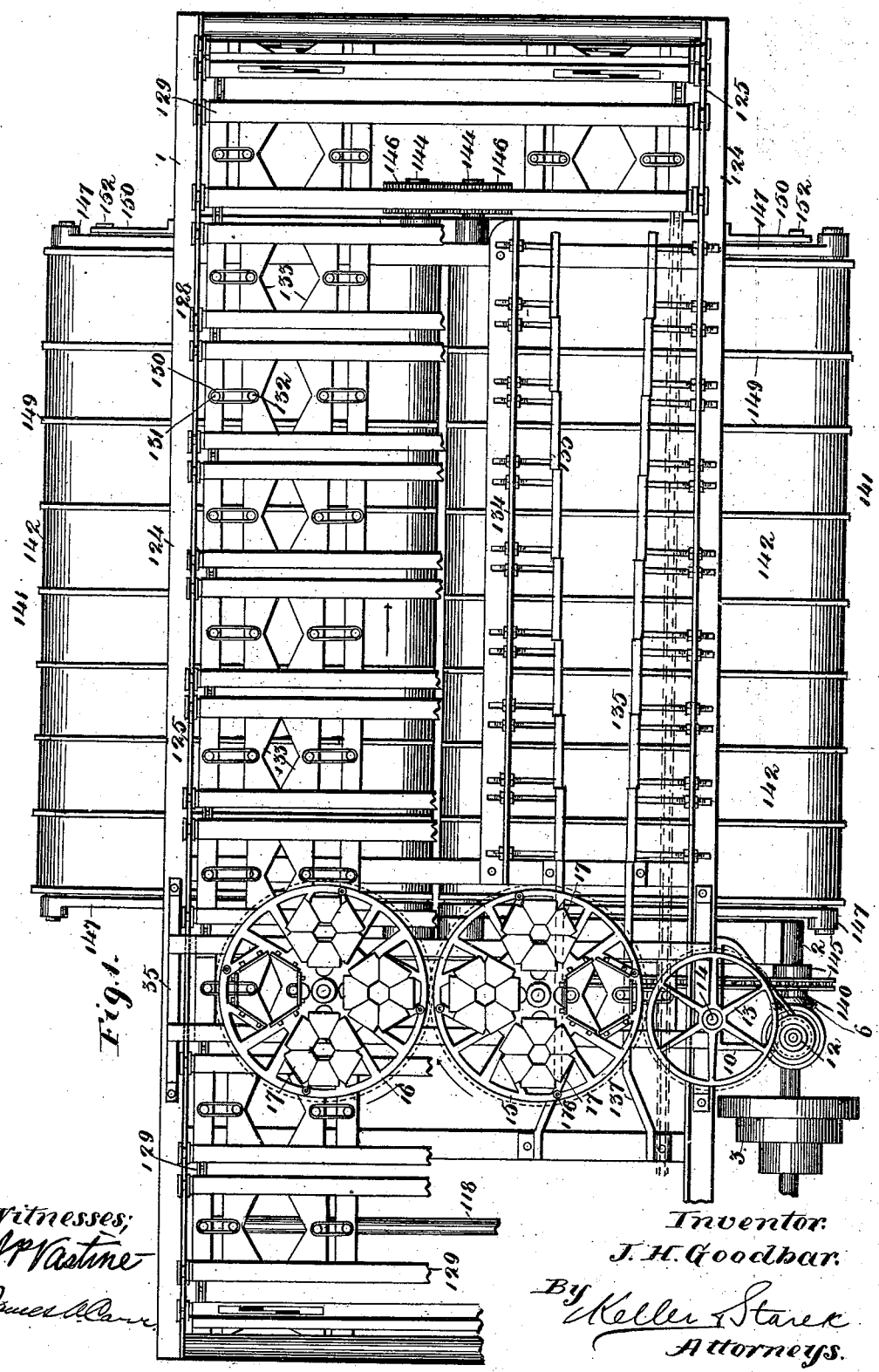

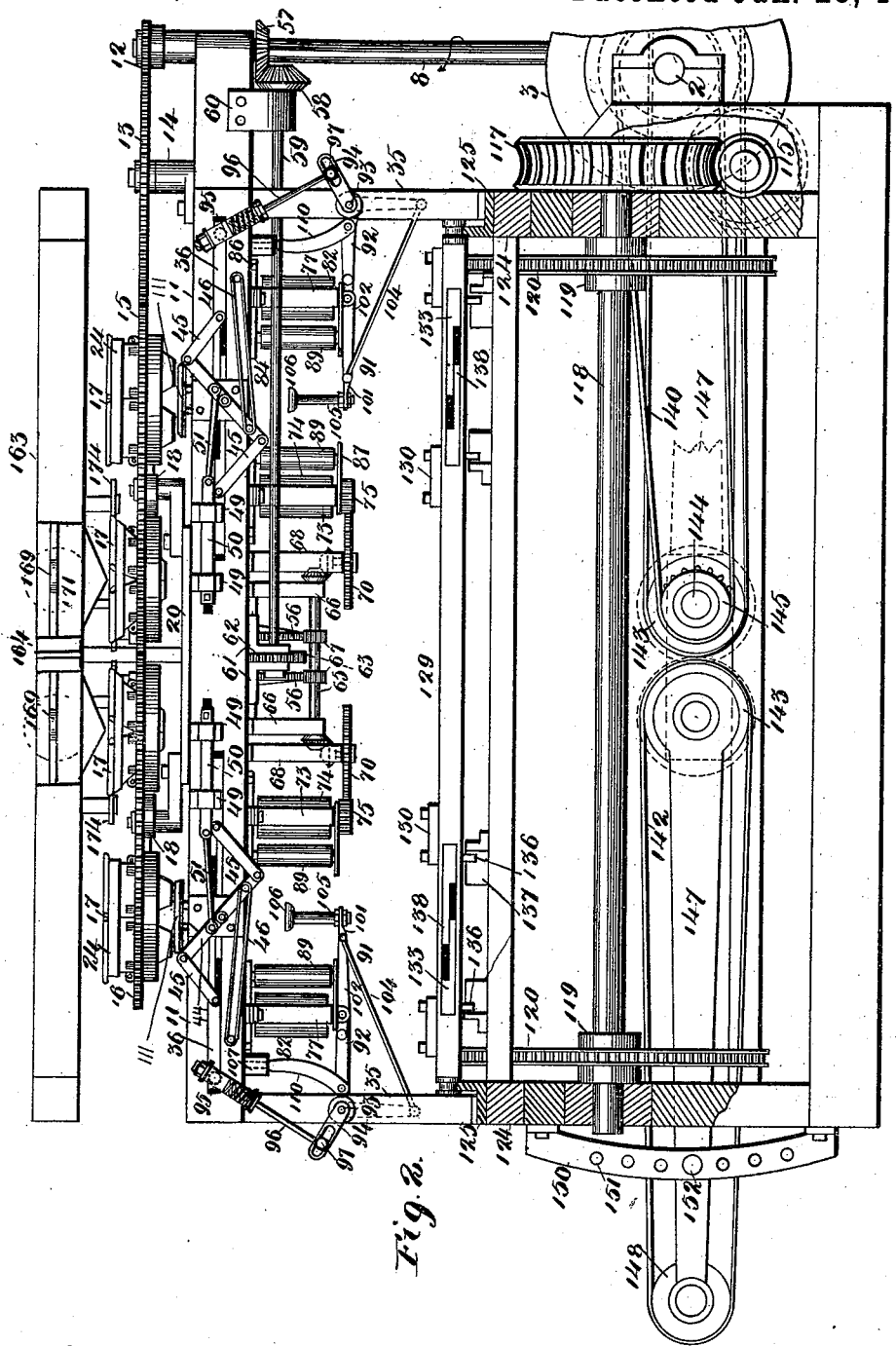

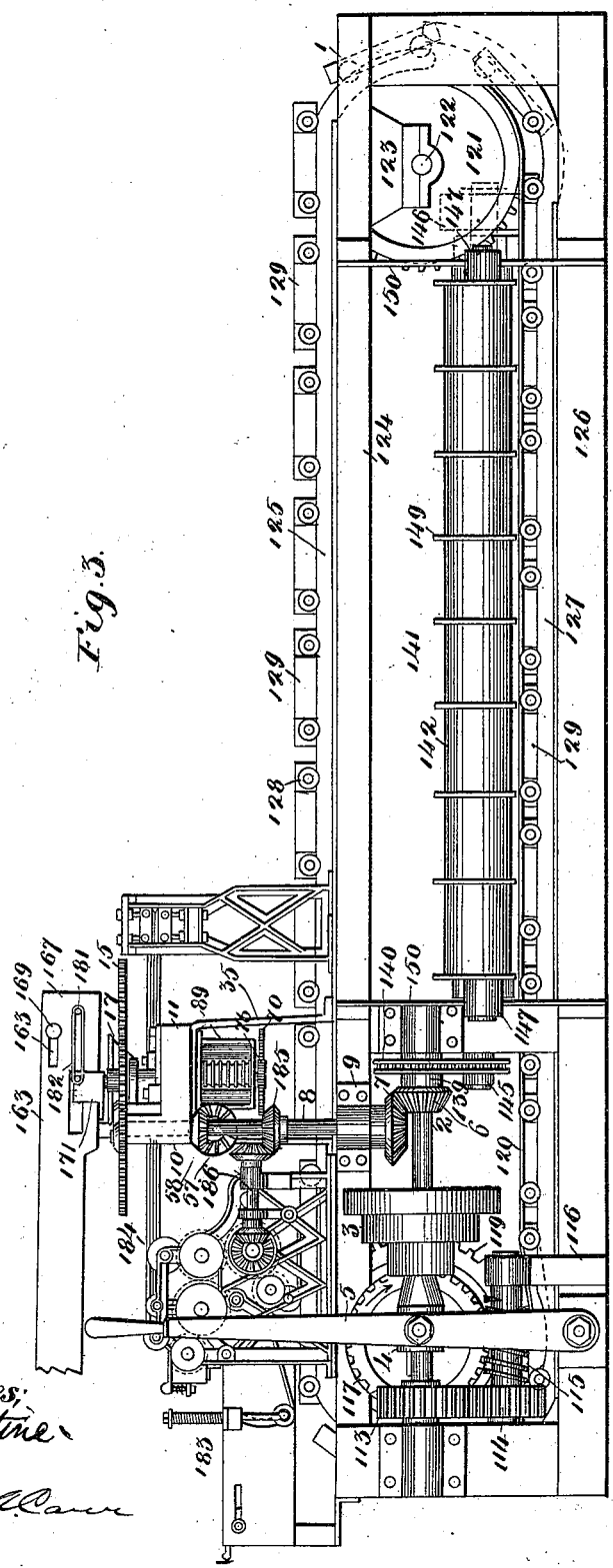

(No Model.) 9 Sheets—Sheet 4.
J. H. GOODBAR.
COMBINED WRAPPING AND SIZING MACHINE FOR ORANGES, &c.
No. 553,559. Patented Jan. 28, 1896.
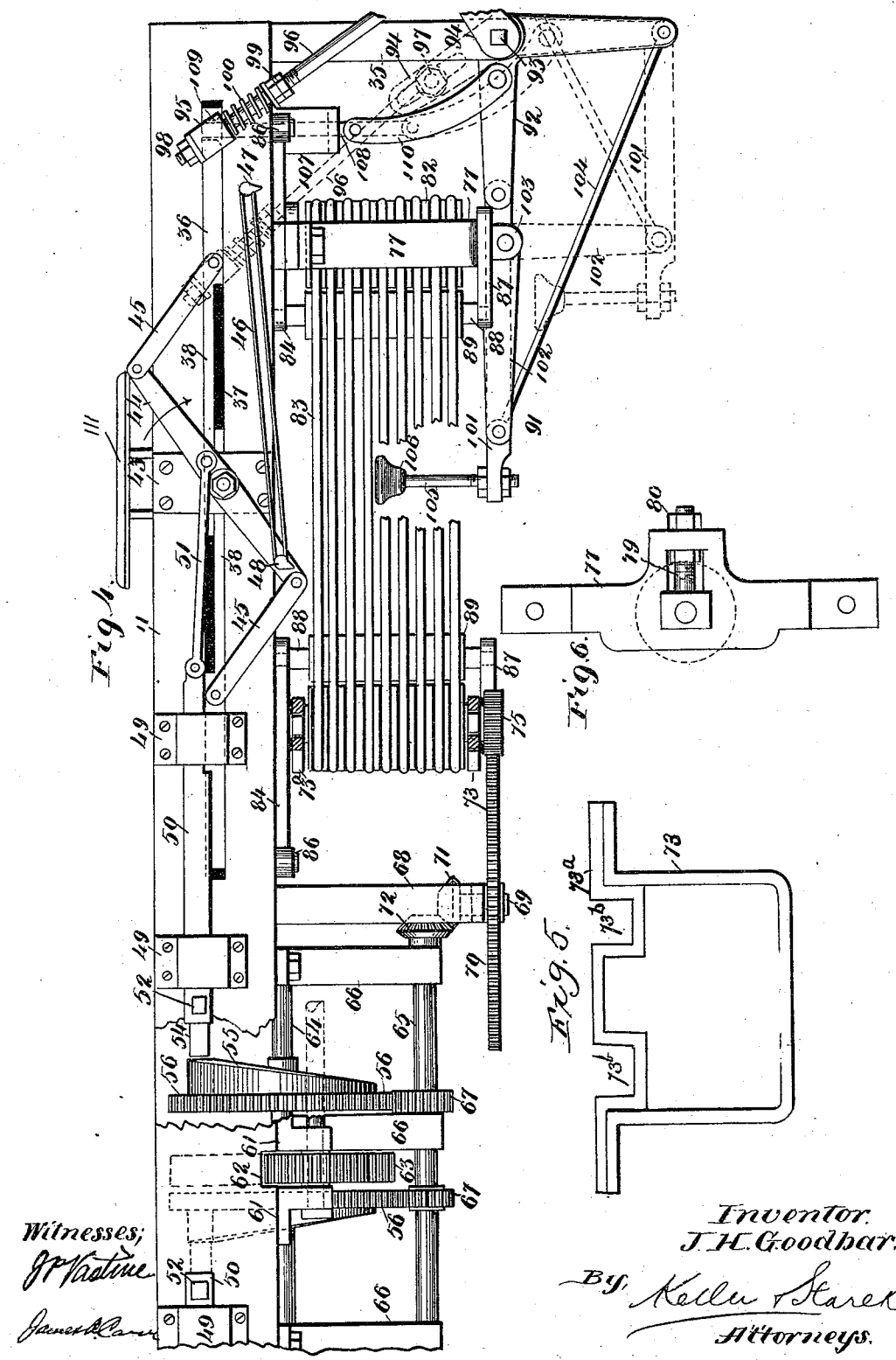

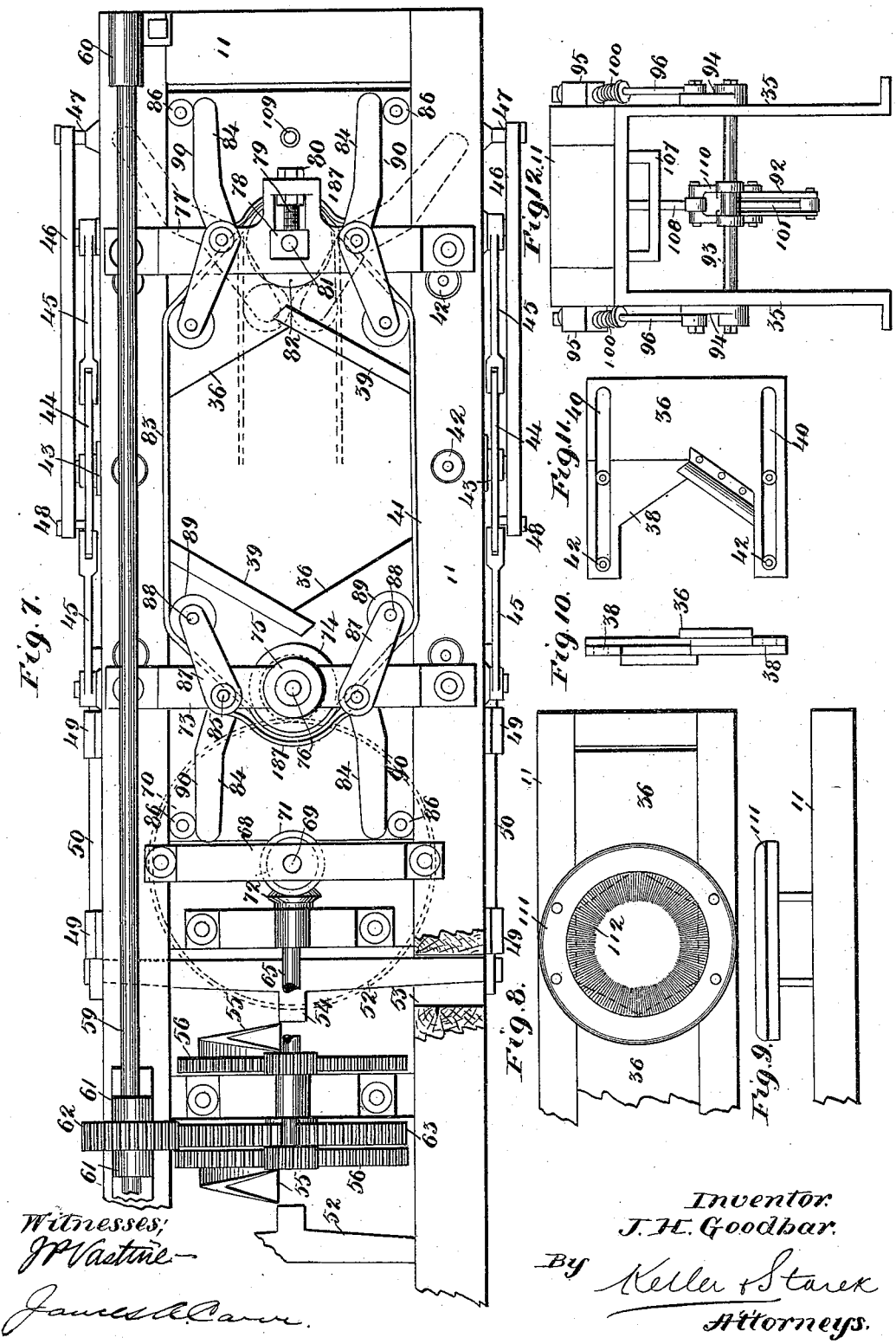

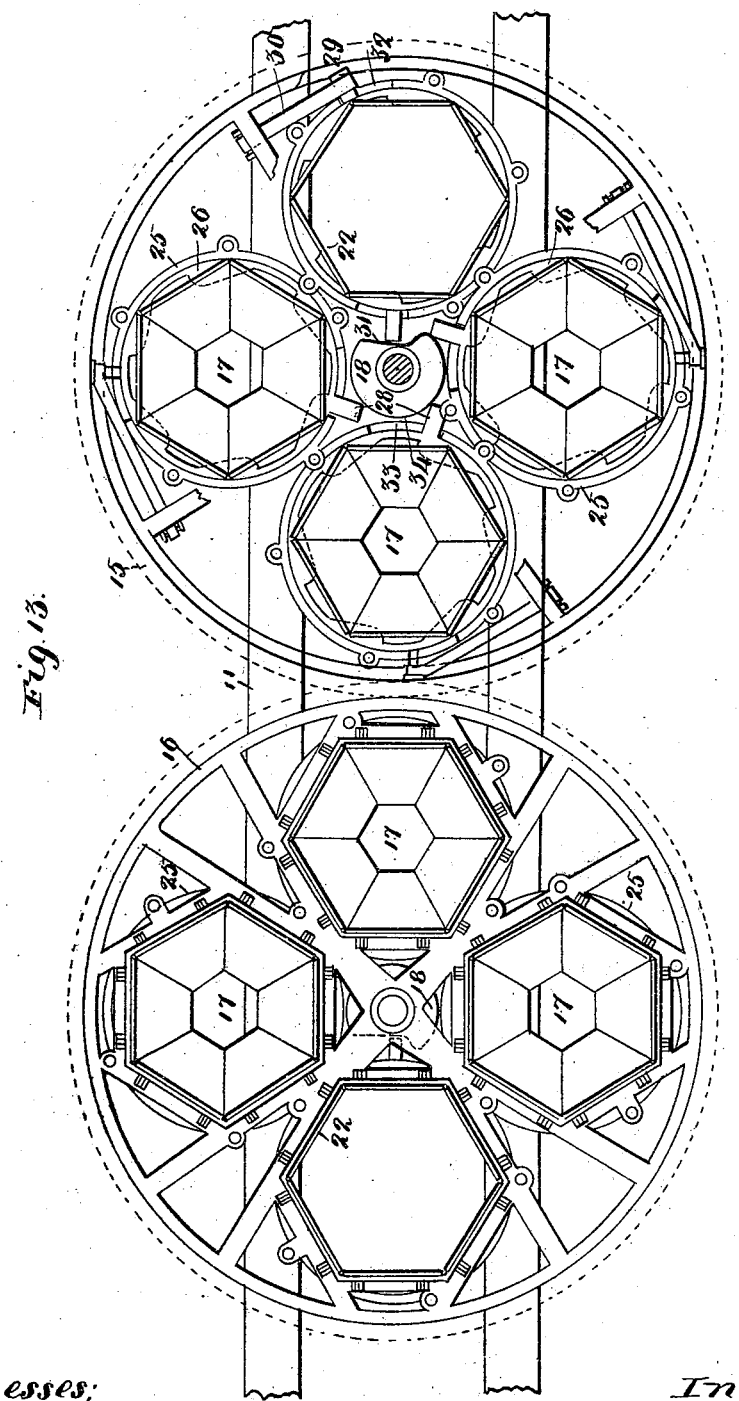

(No Model.) 9 Sheets—Sheet 7.
J. H. GOODBAR.
COMBINED WRAPPING AND SIZING MACHINE FOR ORANGES, &c.
No. 553,559. Patented Jan. 28, 1896.
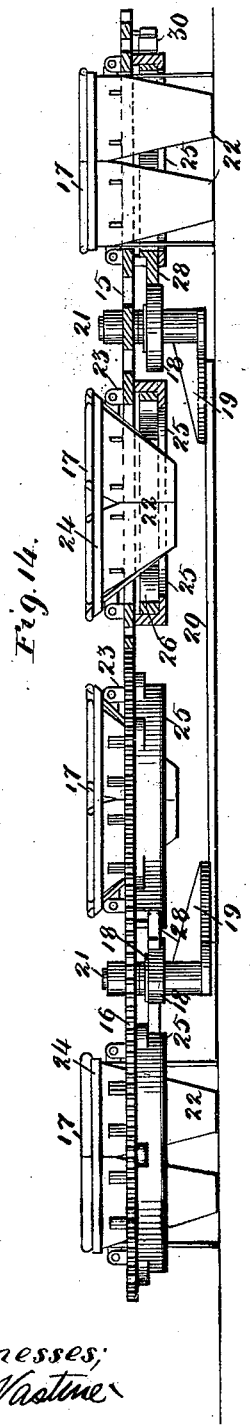
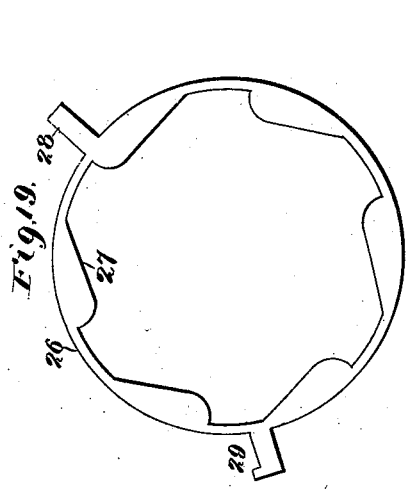
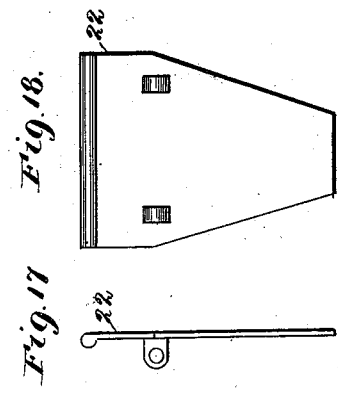
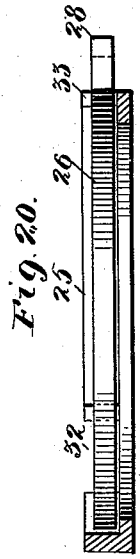
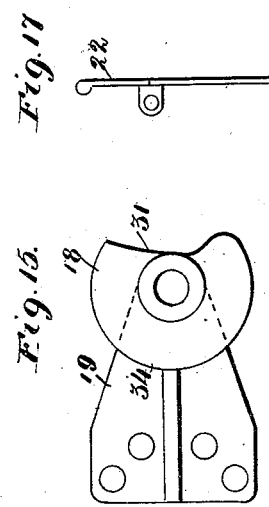
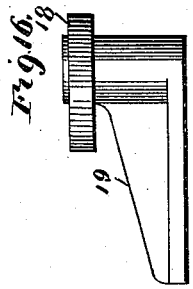
Witnesses:
Inventor:
J. H. Goodbar.
By Keller & Starek
Attorneys.

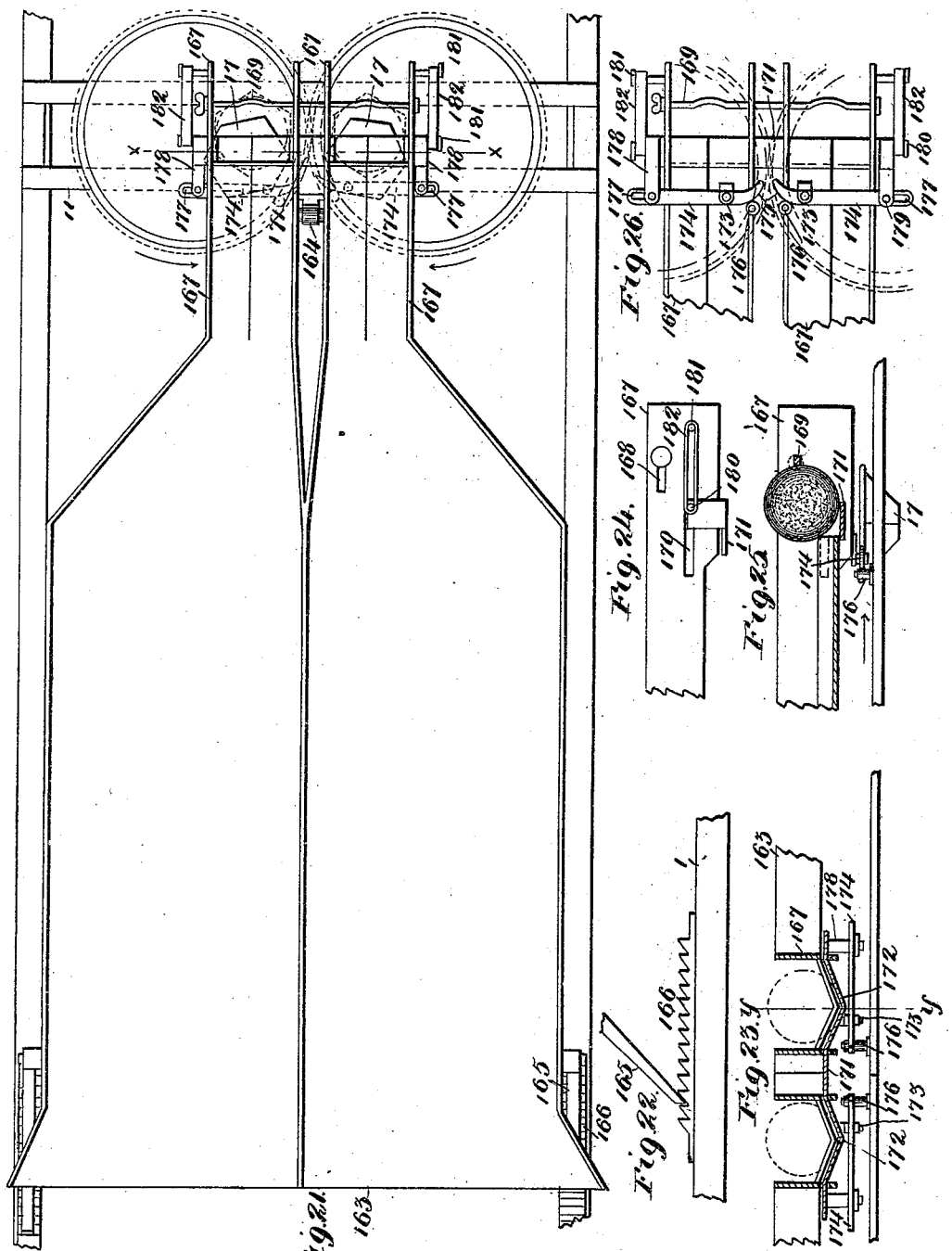

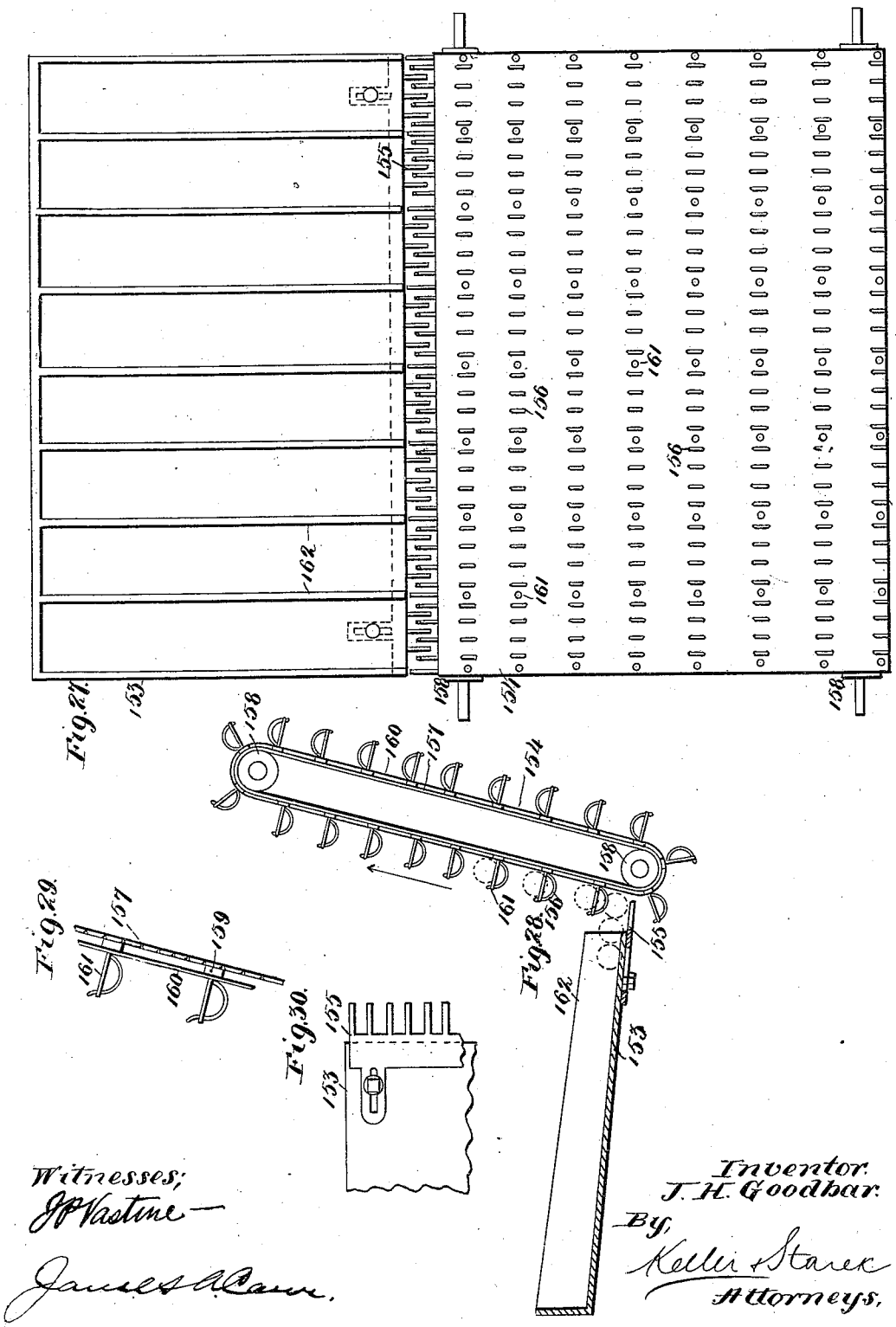

UNITED STATES PATENT OFFICE.

JAMES H. GOODBAR, OF ST. LOUIS, MISSOURI.

COMBINED WRAPPING AND SIZING MACHINE FOR ORANGES, &c.

SPECIFICATION forming part of Letters Patent No. 553,559, dated January 28, 1896.

Application filed November 6, 1893. Serial No. 490,097. (No model.)

*To all whom it may concern:*

Be it known that I, JAMES H. GOODBAR, of the city of St. Louis, State of Missouri, have invented certain new and useful Improvements in a Combined Wrapping and Sizing Machine for Oranges and Like Fruit, of which the following is a full, clear, and exact description, reference being had to the accompanying drawings, forming a part hereof.

My invention has relation to improvements in machines for wrapping and sizing oranges; and it consists in the novel arrangement and combination of parts more particularly set forth in the specification and pointed out in the claims.

In the drawings, Figure 1 is a top plan view of my invention with feeding mechanism detached therefrom and parts broken away. Fig. 2 is an end view with parts broken away and having the feeding device attached thereto. Fig. 3 is a side view of my complete invention with paper-feeder attached thereto. Fig. 4 is a detail view in side elevation showing the twister and holder and mechanism operated thereby. Fig. 5 is an end view of one of the brackets for supporting and adjusting one of the rollers forming a part of the twister. Fig. 6 is a bottom plan view of another bracket. Fig. 7 is a bottom plan view of the twister and holder, with parts broken away. Fig. 8 is a top plan view of the frame which comprises a portion of the holder, and Fig. 9 is a side elevation of the same. Fig. 10 is an end view of one of the plates comprising a part of the holder. Fig. 11 is a top plan view of the same. Fig. 12 is an end view of the frame forming a part of the twister and holder, showing more properly the tripping device used in connection therewith, but showing the supports 35 vertically disposed instead of inclined, as shown in Fig. 3. Fig. 13 is a combined plan and section showing the revolving cups for receiving the oranges as they pass from the chute or feeder and mechanism for operating the same, with the bands and other details removed therefrom. Fig. 14 is a like view in side elevation. Fig. 15 is a top plan view of the stationary cam which operates the mechanism for operating the cups. Fig. 16 is a side elevation of the same. Fig. 17 is an edge view of one of the plates which comprise the cups. Fig. 18 is a plan view of the same. Fig. 19 is a plan view of the internally-cammed ring which co-operates with the plates comprising the cups. Fig. 20 is a side elevation of the same located within a ring, in section, which holds the same. Fig. 21 is a top plan view of the chute or feeding device for the oranges as attached to the frame of the machine. Fig. 22 is a side elevation in detail, showing means for elevating one end of the chute. Fig. 23 is a vertical cross-section taken on the line $x\ x$ of Fig. 21. Fig. 24 is a detail view of one end of the chute, with parts broken away. Fig. 25 is a vertical longitudinal section taken on the line $y\ y$ of Fig. 23. Fig. 26 is a bottom plan view of one end of the chute. Fig. 27 is a plan view showing a modification of the conveyer for delivering the oranges to any suitable elevation. Fig. 28 is a vertical longitudinal section of the same. Fig. 29 is an enlarged detail showing the edge of the conveyer; and Fig. 30 is a bottom plan view of the trough leading to the conveyer, showing a toothed plate adjustably secured to the same.

Generally stated, the present apparatus consists of a suitable feeding device or chute for the oranges, the delivery of which is regulated and controlled by the co-operation therewith of mechanism to which a series of revolving cups intended for catching the individual oranges are secured or form a part of; of suitable means for expanding and contracting to their normal capacity the said cups as each cup is returned to its original position for catching the succeeding or following piece of fruit of the series; of a suitable paper feeding and printing device for furnishing a series of strips within which each orange is wrapped, said feeding and printing device forming in the present instance the subject-matter of a separate application, Serial No. 490,821, filed March 13, 1893; of a suitable holder attached to the frame of the machine and operating so as to retain the free edges of the paper during the wrapping of the orange; of a suitable tripping mechanism containing a retaining-disk for releasing the holder to properly grasp the edges of the wrapping-paper above referred to; of a suitable series of endless traveling elastic and contractile bands adapted by their inherent elasticity to sufficiently embrace and at the same time rotate the orange as it is held within the paper intended for wrapping, thereby twisting the paper about the orange, the said bands and their co-operating parts being herein denominated as the "twister," the holder together with the twister being collectively denominated as the "wrapper and twister;" of suitable means for expanding the elastic bands immediately after the operation of twisting and consequent wrapping is completed, said means being operated in conjunction with the tripping mechanism above referred to and serving to release the orange at the end of the twisting operation; of a suitable sizing device for selecting and distributing the various sizes of fruit after the same has been wrapped; of a suitable conveyer adapted to carry to any determinate elevation the various sizes of fruit distributed by the sizer, and of other details of construction more fully hereinafter described.

Referring to the drawings, 1 represents a rectangular frame, to which the several parts of the machine are attached and upon which they are supported.

The present machine is in reality a double one, like parts being duplicated, as will be seen from the drawings and from the detailed description which is to follow.

Referring particularly to Figs. 1, 2, and 3, 2 represents the main shaft of the machine, to which is keyed a differential belt-pulley 3, and movable upon said shaft in a longitudinal direction is a friction-clutch 4, which co-operates with said pulley for stopping or starting the machine, in the well-known manner.

Loosely secured to the frame 1 of the machine is the lower end of the lever 5, the medium portion of which is movably secured to the clutch 4, the said lever extending a suitable distance above the frame for controlling said clutch. Fixed to the shaft 2 is a bevel-pinion 6, which meshes with a like pinion 7 fixed to the lower end of a vertical shaft 8, said shaft being journaled in a bearing 9 secured to the frame 1, and an additional bearing 10 secured to the transverse support 11.

To the upper projecting end of the vertical shaft 8 is keyed a pinion 12, and meshing with said pinion is a gear-wheel 13 which has its bearing on a separate spindle 14, which is also secured to the support 11; and meshing with said gear-wheel is a large gear-wheel 15 which in turn operates a similar gear-wheel 16. Carried by the gear-wheels 15 and 16 are cups 17 which are closed and opened by the rotation of said gears, the construction of which is now to be described.

Referring to Figs. 13 to 20, inclusive, for illustration, 18 represents a cam which is provided with a support 19, and is fixed rigidly to the strip 20 secured to the support 11, the gear-wheels 15 and 16 rotating about a spindle 21 projecting from the upper surface of the cam 18. Of the cups 17 there are eight in number, each gear-wheel 15 and 16 carrying four such cups, and each cup being provided with six hinged plates 22 projecting above and below the said gear-wheels. Secured to the upper surfaces of the gear-wheels 15 and 16 are ears 23 which form bearings or pivotal supports for said plates, and passed around the outside of the plates comprising each cup, and above their pivotal connections, are elastic bands 24 which operate the plates, and thus opening the cups after said plates have been released by the mechanism hereinafter described.

Secured to the under surfaces of the gear-wheels 15 and 16 and immediately below and surrounding the said plates composing the cups are rings 25, each of which is provided with an interiorly-cammed ring 26, the cam-surfaces 27 of which correspond in number to the number of plates comprising each cup, the said cam-surfaces co-operating with the outer lower surfaces of the plates 22, thus closing the cups when the rings 26 are partially rotated in the proper direction. Projecting from each ring 26 and forming a part of the same are extensions 28, which, when the wheels 15 and 16 are rotated, come in contact with the edge of the cam 18, thus turning the ring 26 in a proper direction for closing the cups. Also projecting from each ring 26 is an additional arm 29, and secured in any mechanical manner to the gear-wheels 15 and 16 are elastic bands 30 which are passed around said arms for moving the rings 26 in the opposite direction when the extensions 28 come in contact with the decreased portions 31 of the cam 18, thus moving the cam-surfaces 27 of the rings 26 out of contact with the plates 22 forming the cups, whereby said plates are free to be operated by the elastic bands 24 previously referred to, and the cups will be automatically opened for dropping the oranges that may be located therein.

By referring to Fig. 20 it will be seen that the rings 25 which hold the rings 26 are cut away, as shown at 32 and 33, for the passage of the arm 29 and extension 28, respectively, the said cut-away portions being of sufficient length to permit of a limited movement of the rings 26.

It will be understood that the enlarged portions 34 of the cams 18 operate to hold the extensions 28 of the rings 26 in the position, as shown to the right in Fig. 13, for holding the cups in a closed position.

It will be understood that the support 11, which may be considered a portion of the framework of the machine, is fixed and supported to the main framework 1 by supports 35, and movably secured within the support 11 are the holders for the wrapping-paper, each holder being composed of two movable plates 36 reciprocating or sliding to and from each other, as hereinafter described.

Referring to Figs. 4 to 12, inclusive, 37 represents slots which are formed in the sides of the support 11 and within which move the plates 36, said plates having each a reduced portion 38 contiguous to one another and lying in planes one above the other, so that said reduced portions are superposed, as clearly shown in Fig. 4, so that by this arrangement the opposite diagonal edges 39 of the plates 36 are permitted to be brought together for holding the free edges of the wrapping-paper while the orange and the paper about it are being revolved below the same. Formed in each of the plates 36 are two slots 40, and journaled within the longitudinal beams 41 are rollers 42, which pass through said slots 40, thus guiding the direction of said plates and holding the same within the support 11.

Secured to the outer surfaces of the beams 41 are plates 43 to which are secured intermediate of their ends levers 44, and connecting the edges of said plates with the ends of the levers 44 are plates 45, which cause the plates 36 to be operated simultaneously when motion is imparted to the levers 44. 46 represents elastic bands which are passed around pins 47 secured to the beams 41 and pins 48 carried by the levers 44, respectively, for closing the plates 36 when released by the mechanism hereinafter to be described. Secured to the outer surfaces or sides of the beams 41 are guides 49, within which move plates 50, the plates being connected to the levers 44 near the pivotal connections of the latter by connecting-rods 51. The opposite ends of the plates 50 are connected in pairs to one another by bars 52, which move in slots 53 formed in the beams 41, and each bar is provided with a projection 54 with which co-operate the cam-surfaces 55, forming a part of the gear-wheels 56, motion being imparted to said cams in a manner now to be described. Keyed to the vertical shaft 8 is a bevel-pinion 57, and meshing with said pinion is a similar pinion 58 fixed to the projecting end of a transverse shaft 59, the said shaft being journaled in bearings 60 and 61. Fixed to the transverse shaft 59 is a pinion 62, which meshes with a gear-wheel 63, which is secured to a shaft 64, to which the combined gear-wheel and cam 56 is also secured, the shaft 64 being journaled in separate bearings and in any well-known manner to the support 11.

65 represents a short transverse shaft which has its bearings in the lower ends of the brackets 66, and keyed to the said shaft intermediate of its ends are pinions 67, which mesh with the gear-wheels 56 for imparting motion to the said shaft. Secured to the under surface of the support 11 are additional brackets 68, which extend somewhat below the brackets above referred to, to the lower ends of which are loosely journaled short shafts 69, and keyed to said shafts 69 are gear-wheels 70. Fixed to the upper ends of the shafts 69 are bevel-pinions 71, which mesh with similar pinions 72, keyed to the ends of the shaft 65.

Having described the holding device for the paper and the mechanism for operating the same, I shall now describe the twisting mechanism, which is located immediately below the former and attached to the under side of the support 11. 73 represents brackets which are attached to and depend from the supporting-frame 11, and journaled vertically within the same are grooved rollers 74, around which a series of belts or bands pass, motion being imparted to the same by the said rollers by pinions 75, keyed to the lower end of the shafts 76, projecting below the brackets 73, which pinions mesh with the gear-wheels 70, as best shown in Fig. 4. A cross-bar 73$^a$ goes across the open top of the bracket, and in it the upper end of the groove-rollers 74 are journaled, the cross-bar having channels 73$^b$ in its upper face to permit the passage of the hereinafter-described rollers 86.

77 represents brackets which are attached to the supporting-frame 11 in a similar manner and are constructed like the brackets 73, the same differing from the latter by being provided with adjustable bearings 78, which are regulated by the screws 79 and nuts 80, only the lower being shown in Fig. 7, the upper bearing being similar in construction. Within these adjustable bearings the shafts 81, which support the grooved rollers 82, rotate, said bands or belts 83 passing around said rollers, as shown in Fig. 4.

84 represents arms which are movably secured to the brackets 73 and 77 by shafts 85, supported or mounted vertically in said brackets, said arms being located adjacent to the plates 36, and with which co-operate the rollers 86, carried by said plates in a manner as shown in Fig. 7.

Fixed to the lower ends of the shafts 85 and below the brackets 73 and 77 are short arms 87, and passing through the ends of the same and one end of the arms 84 are shafts 88, to which are secured vertically-operating rollers 89, said rollers being located between said arms and moving loosely on the same. By this construction of arms and rollers the belts or bands 83 are caused to be expanded, said rollers being brought in contact with the bands when the rollers 86 come in contact with the edges 90 of the arms 84—that is, when the plates 36 are in an open position for allowing the orange to pass between the same and between the belts. When, however, the plates are released by the mechanism hereinafter to be described, the plates 36 will come together and grasp the edges of the paper about the orange, and the rollers 86 will move out of contact with the arms 84 and allow the rollers 89 to come together in the position as shown in dotted lines in Fig. 7, and allow the bands 83, which are elastic, to contract and embrace the orange located between the same to be rotated by the revolution of said belts and thus twist the paper about the fruit.

In order to release the plates 36 at the proper time, I employ tripping devices which are actuated by the drop of the fruit into its proper position between the bands for wrapping.

91 represents the tripping devices, each of which is provided with two angular-shaped arms 92, the medium portions of which are fixed to a transverse shaft 93, which shafts have their bearings in the supports 35, the ends of said shafts projecting a suitable distance on either side of the supports, and to which are fixed slotted plates 94.

To the edges of the plates 36 nearest the ends of the supporting-frame 11 are movably secured blocks 95, and passing through said blocks are rods 96, the lower ends of which are adjustably secured to the plates 94 by nuts 97. Screwed upon the upper ends of the rods 96 are nuts 98, and interposed between the blocks 95 and the nuts 99 are springs 100 to take up any jar to which the tripping device is subjected; and by the employment of the slotted plates 94 an accurate adjustment can be made for the tripping devices. Movably secured between the upper ends of the arms 92 are connecting-bars 101, the same being also loosely secured to the ends of the plates 102, which plates are also movably secured to the bearings 103 fixed to the brackets 77. Loosely secured to the lower ends of the arms 92 and between the same are connecting-rods 104, the same being also loosely secured to a point where the plates 102 are attached to the connecting-bars 101, and operate to strengthen and support the various parts composing the tripping device. To the free ends of the connecting-bars 101 are adjustably secured stems 105, to the upper ends of which are secured supporting-disks 106 upon which the orange drops from the cups 17 for releasing the plates 36 and the belts or bands from their expanded positions simultaneously.

Secured to the bottom of the supporting-frame 11 and near the ends of the same are attached guides 107 within which move bolts 108, the upper ends of which are received by the openings 109 formed in the plates 36 nearest the ends of the supporting-frame 11 when said plates are forced into an open position, and thus temporarily hold the same in said position. Attached to the lower ends of said bolts are the upper ends of curved plates 110, the lower ends of said plates being movably secured to the arms 92 adjacent to their pivotal connections, by which construction the said bolts are pulled out of the openings 109 by the weight of the fruit upon the disks 106 and the plates 36 are freed to be operated for closing by the elastic bands 46.

Supported above and attached to the supporting-frame 11, and immediately over the opening between the plates 36 when the same are in an open position, are rings 111 containing interior brushes 112 of hair, bristles or similar material through which the oranges and paper pass before they are twisted by the revolving bands 83, the object of the brushes being to tuck up the paper about the orange before it is wrapped and the edges of the paper caught by the edges of the reciprocating plates 36.

After the orange has been wrapped by the mechanism previously described the same is released and drops upon an endless sizing device, the construction of which I shall now proceed to describe.

Referring again to the power-shaft 2, and particularly to Figs. 1, 2, and 3 of the drawings, 113 represents a gear-wheel which is fixed to the said shaft and which meshes with a similar gear-wheel 114 located below the same, said last-named gear-wheel being secured to a worm-pinion 115, which has its bearings in a bracket 116 and frame 1, respectively. Meshing with the said worm-pinion is a worm-wheel 117, which is fixed to one end of a transverse shaft 118, said shaft having its bearings in the main frame 1 of the machine, as shown clearly in Fig. 2. Fixed to the said shaft 118 and adjacent to the opposite sides of the frame 1 are sprocket-wheels 119, over which endless sprocket-chains 120 pass, and to which chains are attached the sizing devices hereinafter to be described.

Referring to Fig. 3, 121 represents a second set of sprocket-wheels, which are keyed to a transverse shaft 122, journaled in bearings 123, fixed to the frame 1, over which sprocket-wheels the sprocket-chains 120 also pass. Secured to the top beams 124 of the frame 1 are tracks 125, and secured to the lower beams 126 are similar tracks 127, on which the wheels 128 carried by the frames 129 move. All the frames 129 are similarly constructed and individually operated in a manner now to be described. The frames 129 are each provided with two sets of reciprocating plates 133, the same being operated in one direction or separated from one another by elastic bands 130 passing around pins 131, secured to the frame 129, and pins 132, fixed to the said plates 133. Adjustably secured to the sides of the tracks 125 and an additional strip 134 are bars 135, progressively receding from a common central line between the tracks and strips, as said bars are progressively removed from the revolving cups, thereby forming a series of steps between any two consecutive bars, whereby the plates 133, carried by the frames 129, are gradually allowed to separate, thus widening the space between them as they depart from the revolving cups to the opposite end of the machine. Fixed to each of the plates 133 and projecting from the under side of the same are pins 136, as shown in Fig. 2, which come in contact with the adjustable bars 135, and thus regulate the movement of the said plates in one direction, the co-operation of the pins with the said bars almost closing the plates as they pass under the revolving cups and gradually allowing them to recede from one another as they depart from said cups.

It will be understood that the plates 133 are separated from each other to their fullest extent after they pass the bars 135, and remain in said position until the projecting pins 136 come in contact with the V-shaped guideways 137 located at and attached to the upper portion of the framework 1 and at that end of the machine nearest the revolving cups, closing said plates to their fullest extent and before the same pass under the twisting device. It is also to be noted that all of the frames 129 are attached in any mechanical manner to the sprocket-chain 120 at predetermined distances apart, and, further, that all are moved simultaneously. The reduced portions 138 of the plates 133 overlap in the same manner and are similar in construction to the reduced portions 38 of the plates 36. Also fixed to the main shaft 2 of the machine is a sprocket-wheel 139, over which a sprocket-chain 140 passes and which imparts motion to two endless conveyers, the construction of which I shall now proceed to describe.

141 represents the endless conveyers, which are composed of a number of belts 142 passing over cylindrical rollers 143, which are located adjacent to one another and fixed to shafts 144, which are journaled in any mechanical manner to the frame 1, as shown in Fig. 1. To one end of one of the shafts 144 is fixed a sprocket-wheel 145, over which the sprocket-chain 140 passes for imparting motion to the conveyers. To the opposite ends of both of the shafts 144 are fixed gear-wheels 146, which mesh with one another, whereby motion is imparted to both of the said conveyers simultaneously.

147 represents arms one end of each of which loosely embraces the shafts 144, the opposite ends of said arms projecting a suitable distance on either side of the frame 1 and operating as bearings for the cylindrical rollers 148, over which the endless belts 142 also pass. The belts 142 are separated by strips 149, as best seen in Figs. 1 and 3, whereby oranges of various sizes are separated from one another and delivered to proper receptacles for receiving the same. Attached to the frame 1 are plates 150 having openings 151 formed therein, through which pins 152 are passed and into the arms 147 for holding the conveyer in an adjusted position or at a proper inclination for delivering the oranges.

In Figs. 27 to 30, inclusive, I have shown a modification of the conveyer which is more adapted for the present purpose and is designed especially for elevating the oranges to any desirable height. In said figures, 153 represents troughs which are arranged side by side and are fixed at an incline so as to cause the orange by its own gravity to roll toward the endless conveyer 154. To the bottom of said troughs is adjustably secured a toothed plate 155, between the teeth of which the hooks 156 pass for receiving the oranges located upon the toothed plate, as shown in Fig. 28. The said endless conveyer 154 is composed of an endless sprocket-chain 157 passing around sprocket-wheels or drums 158, and attached to said chains are strips 159, to which is secured an endless sheet of canvas 160 or any similar material. The hooks 156 are passed through the canvas and into the strips which securely hold the same, and also fixed to said strips are pins 161, which are arranged in a line transverse to the length of the conveyer, and are located opposite the partitions 162 forming a part of the troughs 153, whereby the fruit of various sizes is separated while being elevated.

In order to feed the oranges to the revolving cups at the proper time, I employ a chute or trough which is superposed over said cups and is operated by the gear-wheels which carry the revolving cups, the mechanism being so devised as to drop two oranges simultaneously, one for each cup, as the latter pass under the depositing end of the chute, and the construction of which is as follows:

163 represents the chute or trough the forward end of which is pivoted to the transverse supporting-frame 11 by a bracket 164, the opposite end of said chute being adjustable to any inclination by legs 165, which are movably secured to the sides of the trough, the lower ends of which engage with ratchet teethbars 166, secured to the frame 1, whereby the oranges are fed by gravity to the depositing end of said chute. The depositing or delivery end of the chute is divided into two separate troughs 167 of a width to admit but one orange and guide the same to the point of delivery, the bottom of said troughs 167 being V-shaped, as shown in Fig. 23. The sides of the troughs 167 project a suitable distance beyond the bottoms of the same and are provided with slots 168 within which is adjustably secured a bar 169 against which the orange comes in contact before the same is dropped. 170 represents slots which also are formed in the projecting ends of the troughs 167, within which moves a plate 171, the V-shaped portions 172 of which move freely under the V-shaped bottoms of said troughs for releasing the oranges supported by said plate and allowing the same to drop by gravity when the plate is moved under the bottom of the troughs by the mechanism now to be described.

Secured to the bottoms of the troughs 167 are bearings 173 to which are pivoted levers 174, the short arms of which are curved as shown at 175, with which the rollers 176 carried by the gear-wheels 15 and 16 come in contact for operating both levers simultaneously. The opposite ends of the levers 174 are slotted, as shown at 177, and passed through the extensions 178 of the plate 171, and through the said slotted ends of the levers are pins 179 whereby a movable connection is made and the said plate operated in the proper direction for dropping the orange when the curved ends of the levers are struck. Fixed to the ends of the plate 171 are pins 180, like pins 181 also being fixed to the sides of the troughs 167, over which pins elastic bands 182 are passed for operating the plate 171 in the opposite direction, or closing the delivery ends of the chutes and holding back the oranges which have rolled in position to be dropped until the next cup has passed into position immediately below the delivery ends of the chutes.

183 represents a combined printing and feeding device for feeding printed paper into position immediately below the revolving cups as the oranges drop from said cups. This device is so constructed as to feed cut or sheet paper held between and fed under the revolving cups by the belts 184, motion being imparted to the latter from the vertical shaft 8, bevel-pinion 185, and gearing 186 meshing with said pinion, through intermediate mechanism for printing and feeding, and forming the subject matter of a separate application.

The operation of the machine is as follows: The oranges to be wrapped, sized and conveyed are placed upon the main chute 163 and by gravity roll to the branch troughs 167, which, as before stated, are of a width sufficient to accommodate but one orange of the series, the forward orange of which rolls against the bar 169 and rests upon the plate 171 in a position to be dropped, as shown in Fig. 25. As the gear-wheels 15 and 16, which carry the revolving cups, rotate in the direction as shown by the arrows in Fig. 21, the rollers 176 will strike the short curved ends of the levers 174 and cause the plate 171 to be moved under the troughs 167 and allow the oranges resting upon the said plate to drop by gravity, the elastic bands 182 operating to move the plate 171 back to its normal position to support the succeeding oranges before the same have rolled against the bar 169 and until the levers 174 are again struck by the succeeding rollers 176, whereby the operation is repeated. Located immediately below the delivery ends of the troughs 167 are the gear-wheels 15 and 16 which carry the revolving cups 17, two oranges being dropped simultaneously as two of the cups pass under the delivery ends of said troughs, whereby the oranges are received and carried to a point diametrically opposite of the circle within which the cups rotate and are dropped, the rollers 176 being arranged at predetermined distances apart on the wheels 15 and 16 and are four in number—that is, corresponding to the number of cups whereby the plate 171 will be moved under the troughs as two of the cups move under the delivery ends of the same, so that said cups will be in a position to receive the oranges immediately upon being released or dropped. As before stated, the cams 18 are stationary and are of such a construction as to release only one cup of each wheel at a time as the gear-wheels 15 and 16 rotate, which is caused by the arms 28 of the cam-rings 26 coming in contact with the decreased portions 31 of said cams, allowing the elastic bands 30 to partially rotate the said cam-rings whereby the cam-surfaces 27 are moved out of contact with the outer surfaces of the plates 22 of said cups, the elastic bands 24 operating to open the cups in the position as shown in Figs. 13 and 14. When the cups open to their fullest extent, as just described, the oranges drop, as above stated, falling upon the sheets of wrapping-paper under the same, which is fed by the belts 184 of the printing and feeding device 183. As each sheet is struck by the falling orange the same is removed or detached from the belts, encompasses the orange and still further falls with it through the hair ring 111, which snugly tucks the paper about the orange in a position to have its free edges readily grasped by the folding devices. As the oranges and paper drop they pass between the plates 36 of the holders which are now in an open position, the oranges with their paper about them falling still farther until they strike the disks 106 of the tripping devices 91, at which instant and by which action the plates 36 are released and by the action of the elastic bands 46 are instantly brought together and grasp the free edges of the wrapping-paper about the orange. While so held, the oranges are already in a position between the revolving belts or bands 83, which embrace the orange snugly, having been allowed to assume their contracted position by the release of the rollers 89, arms 84 and 87, at the instant that the plates 36 of the holders come together. The restoration of the rollers 89 to their closed position is effected by the rollers 86 carried by the plates 36 moving out of contact with the edges 90 of the arms 84, so that the moment the orange strikes the tripping device the plates 36 are released and the elasticity of the revolving belts 83 contracts the arms 84 and 87, as shown in dotted lines in Fig. 7, allowing the said belts to embrace the orange, as previously stated. Motion is imparted to the belts or bands 83 in the proper direction by the grooved rollers 74, over which they pass, pinions 75, gear-wheels 70, shafts 69, bevel-pinions 71, similar pinions 72, shaft 65, pinions 67, and gears 56, the latter gearing receiving motion from the main power-shaft by intermediate gearing. (Shown in Fig. 4 and fully described in the specification.) As the bands revolve, the orange between them is given proper rotation and the paper is twisted and wrapped around the same. In order to restore the holder, twister, and tripper to their open or normal position the cams 55, forming a part of the gear-wheels 56, are brought in contact with the lugs 54 of the bars 52, causing the plates 50 and connecting-rods 51 to operate the levers 44 in the direction as shown by the arrow in Fig. 4, and by the aid of the connecting-plates 45 the plates 36 are forced apart or separated from one another. As the said plates 36 are forced apart, the rollers 86 carried thereby will come in contact with the edges 90 of the arms 84, causing the rollers 89 to be brought in contact with the belts or bands 83 and expand the same simultaneously with the opening of said plates. It is further to be noted that as the plates 36 are caused to assume an open position the tripping devices 91 are brought back to their normal position, as shown in solid lines in Fig. 4, by their connection with one of the plates 36, the bolts 108 of said tripping devices being then in a position to be received by the openings 109 formed in the plates 36, to which the tripping devices are attached. When the plates 36 are in their closed position the several parts of the tripping devices will assume the position as shown in dotted lines in Fig. 4, being moved out of the way to allow the oranges to drop or pass by the same in their descent to the sizing device. As the plates 36 are being opened, the connecting-rods 96, forming a part of the tripping devices, will operate the angular levers 92, causing the bars 101 to be forced in a horizontal position and the plates 102, which are pivoted to plates 103 and to said bars, in a similar horizontal position. The plates 110 are also pivoted to the angular levers 92, and thus by the movement of the latter the bolts 108 are forced upwardly and pass into the openings 109 of the plates 36 for holding said plates in an open position until the disks 106 are struck by an orange, when said plates 36 will be released, as before described.

After the oranges have been wrapped and released from the revolving bands 83, they fall by gravity upon the endless sizing device, which runs longitudinally the entire length of the frame 1 of the machine, and which is located immediately below the twisting devices, as best shown in Fig. 2. From the description of the construction of the said sizing device it will be remembered that the reciprocating plates 133 carried thereby are in an approximately-closed position when they are moved immediately under the twisting devices, and while said plates are in this position they receive between them the oranges so dropped, said oranges being carried thereby over the endless conveyer to points where the same are dropped according to their size by the opening of the consecutive pairs of plates of the series constituting the sizer, as the sizer moves in the direction shown by the arrow in Fig. 1. As the endless sizing device moves in the direction as shown in Fig. 1, the oranges resting between the plates 133 will remain supported thereon until the plates separate a sufficient distance to allow the orange to pass between them, it being noted that said plates gradually separate from one another as the sizer continues to move in the same direction. This is accomplished by the tendency of the elastic bands 130 to open the plates, the latter being successively opened or separated from each other by the bands 130, the degree to which the plates are separated being regulated and controlled by the pins 136 secured to the bottoms of said plates co-operating with the bars 135, which gradually recede from a common center line of the conveyer, as heretofore stated, and as best shown in Fig. 1. After the plates 133 have passed the last bars 135, said plates are opened to their fullest extent and remain in said position as they pass under the machine, until the pins 136 fixed thereto are brought in contact with the V-shaped guideways 137, which close said plates to their fullest extent before they again pass under the twisting devices and in a position to receive the succeeding oranges. The oranges when released from the sizing device drop upon the conveyer 141 which is composed of a series of endless belts 142 receiving the oranges as sized by the sizing device within the sections or compartments formed by the strips 149 located between the belts, and from which the oranges are delivered from the opposite sides of the machine, fully wrapped and sized.

Motion is imparted to the various parts of the machine by the shaft 2 which operates the delivery ends of the troughs 167, gear-wheels 15 and 16, the plates 36 which comprise a part of the holding devices, the twisting devices and combined printer and feeder for the paper, by the bevel-pinions 6 and 7, vertical shaft 8, pinions 57 and 58, transverse shaft 59, and intermediate gearing previously described, the motion being imparted to the combined printer and feeder for the paper by the bevel gear-wheel 185 and intermediate gear-wheel 186. Motion is imparted to the endless sizing device as follows: The gear-wheel 113 fixed to the shaft 2 imparts motion to the gear-wheel 114, worm-pinion 115, worm-wheel 117, transverse shaft 118, sprocket-wheels 119, sprocket-chains 120 and sprocket-wheels 121 over which the chains also pass, the frames 129 being attached to said chains and moved by the motion of said chains. The endless conveyers 141 are operated from the main shaft 2 by sprocket-wheel 139, sprocket-chain 140, sprocket-wheel 145, shafts 143 and 144 and gear-wheels 146. (Shown in Fig. 1.)

Fixed to each of the frames 73 and 77 are curved plates 187 located adjacent to the rollers 74 and 82, but out of contact therewith, for acting as guides for the bands or belts 83 within the grooves formed in the rollers.

From the foregoing description it will be understood that motion is imparted to the entire mechanism of the machine by the shaft 2 and by the intermediate gearing imparting motion to the gear-wheels 15 and 16 in opposite directions, which in their revolution revolve the cups 17 carried by the same and move the same successively under the delivery end of the chute 163 while the cups are in a closed position for receiving the oranges to be dropped. By the movement of the gear-wheels 15 and 16 the reciprocating plate 171 located at the delivery end of the chute is operated by the mechanism previously described, thus dropping two oranges simultaneously as two of the cups move under the delivery ends. It will be understood that the revolving gear-wheels 15 and 16 continue to revolve without interruption during the operation of the machine, whereby the oranges fed into the cups are carried to a point where they are dropped by the opening of the same, the opening of the cups being effected by the cam-rings 26 moving out of contact with the plates which form the cups, the arms 28 of the rings being brought opposite the decreased portion 31 of the stationary cams 18, thus releasing the plates from their locked position, the elastic bands 24 operating to open the same after their release. When however the arms 28 are brought in contact with the enlarged portions of the cams 18, the cam-surfaces 27 of the cam-rings 26 will be brought in contact with the plates of the cups and close the cups before they return to the delivery ends of the chutes. When the cups open their position is immediately over the reciprocating plates of the holders. The said plates are also open, they being caused to assume the open position by the cams 55 forming a part of the gear-wheels 56 and mechanism co-operating with said plates. The opening of the plates 36 effects the expansion of the twisting device by intermediate co-operating mechanism before described, allowing the oranges with the paper already partially inclosing the same to drop between the revolving elastic bands 83 of the twister. The oranges in dropping strike the tripping devices 91 and cause an instant release of the plates 36 of the holding devices and a simultaneous release of the mechanism which expands the bands, permitting the latter to contract by their elasticity and snugly embrace the orange between them, the holder grasping the edges of the paper as the orange is being revolved between the bands, which continually revolve. The cams 55 forming a part of the gear-wheels 56 cause the plates 36 of the holder and the elastic bands 83 of the twister to expand, releasing the oranges wrapped, the opening of the plates bringing the tripping devices to their normal position, as shown in solid lines, Fig. 4, to be again operated by succeeding oranges to be wrapped. The orange in dropping from the revolving bands 83 falls upon the endless sizing device, where the same is sized, as before stated, and drops upon the endless conveyer, as already described.

Having described my invention, what I claim is—

1. In an orange wrapping machine, a twister composed of a series of traveling alternately distending and contracting elastic and contractile bands, and suitable means for introducing the orange between the laps of said bands when in their distended position, substantially as set forth.

2. In an orange wrapping machine, a wrapper and twister composed of a series of elastic contractile bands for embracing the orange, and reciprocating plates co-operating therewith for holding the free edges of the wrapping paper, substantially as set forth.

3. In an orange wrapping machine, the combination of a twister composed of a series of traveling elastic bands for embracing the orange, and means for distending said bands, the latter resuming their normal position by reason of their contractility, substantially as set forth.

4. In an orange wrapping machine, the combination of a series of traveling elastic contractile bands, means for distending said bands, reciprocating plates for holding the free edges of the wrapping paper, means for bringing the adjacent edges of the plates together, and additional means for simultaneously allowing the bands to resume their normal position and embrace the orange between them, substantially as set forth.

5. In an orange wrapping machine, a twister composed of a series of arms, means for expanding said arms, and a series of elastic and contractile bands for restoring said arms to their normal position, substantially as set forth.

6. In an orange wrapping machine, a twister comprising grooved rollers, a series of elastic contractile bands passed around the same, brackets secured to a frame and supporting said rollers, arms 84 and 87 pivotally connected to said frame, rollers journaled within said arms and co-operating with said bands, and means co-operating with the arms 84 for expanding the bands, substantially as set forth.

7. In an orange wrapping machine, a twister comprising two grooved rollers one of which is adjustable, a series of elastic contractile bands passed around the same, a reciprocating holder, means co-operating with said holder and bands for expanding the latter, and suitable gearing in connection with one of said rollers for rotating the same and imparting motion to the elastic and contractile bands, substantially as set forth.

8. In an orange wrapping machine, a twister composed of a series or set of arms, a holder for expanding said arms, one or more traveling elastic bands surrounding said arms and adapted to restore the same to their normal position, substantially as set forth.

9. In an orange wrapping machine, a holder composed of suitable holding plates, means for separating said plates from each other, a tripping device adapted to catch the fruit and at the same instant release said plates when in their expanded position, and means to instantaneously bring the plates together and secure the edges of the wrapping paper, substantially as set forth.

10. In an orange wrapping machine, the combination of a suitable feed trough, means co-operating therewith for feeding the oranges successively, revolving cups located below the chute or trough, a combined holder and twister located below the cups, and an endless sizing device, substantially as set forth.

11. In an orange wrapping machine, the combination of a feed chute, a plate co-operating with the delivery end of the same for releasing the oranges consecutively, an adjustable bar against which the oranges rest, and means located below said chute for actuating the plate and receiving the oranges to be dropped, substantially as set forth.

12. In an orange wrapping machine, the combination of a feed chute, a sliding plate co-operating with the delivery end of the same, means against which the oranges come in contact, gear wheels located below said chute and co-operating with said plate, contracting and expanding cups carried by said gear wheels, and means for operating the plate in one direction for supporting the oranges within the chute, substantially as set forth.

13. In an orange wrapping machine, the combination of a feed chute, a plate co-operating with the delivery end of the same, an adjustable bar against which the oranges roll when supported by said plate, levers one end of which co-operate with said plate, gear wheels, means secured thereto co-operating with said levers for actuating said plate in one direction, contracting and expanding cups carried by said wheels, and means for moving said plate in the opposite direction, substantially as set forth.

14. In an orange wrapping machine, the combination of a feed chute, gear wheels located below the delivery end of the same and carrying contracting and expanding cups, a plate co-operating with said wheels and delivery end of said chute for allowing the oranges to drop within the cups, elastic bands for restoring said plate to its normal position, and means for adjusting one end of the chute to any elevation, substantially as set forth.

15. In an orange wrapping machine, suitable gear wheels, a series of expanding and contracting cups carried by the same, suitable intermediate mechanism between said gear wheels and cups for closing the latter, and suitable elastic bands passing around the cups for opening said cups, substantially as set forth.

16. In an orange wrapping machine, the combination of the gear wheels 15 and 16, plates hinged to the same forming cups, cam rings movably secured to the wheels and embracing said plates for closing said cups, arms forming a part of said rings, stationary cams with which the said arms co-operate for moving the rings in one direction, and means for operating the rings in the opposite direction for releasing the plates and allowing the cups to open, substantially as set forth.

17. In an orange wrapping machine, the combination of gear wheels 15 and 16, plates movably secured to the same and forming cups, retaining rings 25 secured to the wheels, cam rings 26 movably secured within the same, arms 28 forming a part of said cam rings and projecting outside of the retaining rings, fixed cams co-operating with said arms for moving the cam rings in one direction and closing the cups, means for moving the cam rings in the opposite direction and elastic bands 24 passed around the plates above their pivotal connections for opening the cups, substantially as set forth.

18. In an orange wrapping machine, the combination of a reciprocating holder, plates movable to and from each other forming the same and having reduced portions overlapping one another, means for movably securing said plates at their reduced portions, and suitable mechanism for opening and closing said plates, substantially as set forth.

19. In an orange wrapping machine, the combination of a suitable supporting frame 11, reciprocating plates movably secured within the same, levers 44 attached to the said frame, connecting links attached to the ends of said levers and said plates respectively, plates 50 attached to the frame and guided thereon, connecting rods 51 connecting the said plates 50 with the levers 44, transverse bars 52 attached to the plates 50 and moving in spaces 53 formed in the said frame, cams 55 for moving the bars 52 in one direction, and means attached to the said levers and frame for operating the former in a reverse direction, substantially as set forth.

20. In an orange wrapping machine, a twister comprising two rollers journaled to a suitable supporting frame, an elastic band or bands passing around the same, a reciprocating holder located above said bands, and mechanism actuated by said holder for expanding said bands, substantially as set forth.

21. In an orange wrapping machine, a holder comprising two reciprocating plates, rollers carried thereby, a twisting device located below said plates, grooved rollers forming a part of the latter, elastic bands passing around said rollers, and means co-operating with said bands and rollers for expanding the former, substantially as set forth.

22. In an orange wrapping machine, the combination of a reciprocating holder, a twister located below the same composed of a series of elastic bands, rollers over which the bands pass, means for expanding said bands, and a tripping device adapted to be struck by the orange for releasing the holder from its locked position, substantially as set forth.

23. In an orange wrapping machine, the combination of a suitable reciprocating holder composed of two movable plates, a twister located below the same, and a tripping device co-operating with one of said plates and actuated thereby in one direction, substantially as set forth.

24. In an orange wrapping machine, a tripping device composed of angular shaped levers 92 fixed to a shaft 93, means for supporting said shaft, arms 94 fixed to said shaft, rods 96 attached to side arms, bearings 103, a bar 101, plates 102 connecting the said bearings and bar, one end of said bar being attached to the angular levers 92 and the opposite end supporting a suitable disk 106, plates 110 also movably secured to the angular levers, a bolt 108 carried by the upper ends of said plates, a supporting frame 11 provided with a holder and composed of two reciprocating plates, a guide 107 secured to the bottom of said frame by which the bolt is guided, an opening 109 formed in one of said reciprocating plates for receiving said bolt, and means for attaching the rods 96 to one of said reciprocating plates, substantially as set forth.

25. In an orange wrapping machine, the combination of a suitable frame 1, tracks secured to the same, a series of transverse frames, wheels secured to the frames and moving upon said tracks, reciprocating plates carried by said frames, and endless chains passing around suitable sprocket wheels and secured to said frames, substantially as set forth.

26. In an orange wrapping machine, a sizing device composed of a series of transverse frames, plates movably secured within the same, a series of adjustable bars fixed to the frame of the machine and gradually receding from a central line of the sizer, pins fixed to said plates and co-operating with said bars, and elastic bands connecting said plates and bars for expanding the former, substantially as set forth.

27. In an orange wrapping machine, an endless sizer composed of a series of transverse frames, reciprocating plates carried thereby, bars adjustably secured to the frame of the machine and gradually receding from a common center line of the sizer, pins attached to and depending from said plates, V-shaped guide-ways also fixed to the frame of the machine for closing said plates, and means for actuating the plates into an open position, substantially as set forth.

28. In an orange wrapping machine, the combination of a frame 1, tracks 125 and 127 secured to the same, transverse frames provided with wheels moving upon said tracks, reciprocating plates movable within said frame, elastic bands for opening the plates, a series of adjustable bars receding from a common center line of the sizer, pins depending from and secured to the plates, V-shaped guide-ways also fixed to the frame for closing said plates, endless sprocket chains to which the said transverse frames are secured, sprocket wheels over which the said chains pass, and suitable gearing for imparting motion to said sprocket chains, substantially as set forth.

29. In an orange wrapping machine, the combination of the frame 1, tracks 125 and strips 134, bars 135 adjustably secured to said tracks and strips, tracks 127 also secured to the frame, transverse frames having wheels, reciprocating plates 133, elastic bands secured to said plates and frames respectively, V-shaped guide-ways 137 for closing said plates, sprocket chains 120 to which the frames are secured, and sprocket wheels 119 for imparting motion to said chains, substantially as set forth.

30. In an orange wrapping machine, a trough, teeth projecting from the delivery end of the same, an endless apron, hooks secured to the same and passing between said teeth, and pins also secured to said apron and arranged in a line with the hooks, substantially as set forth.

31. In an orange wrapping machine, an inclined trough divided into compartments, a toothed plate 155 adjustably secured to the bottom of the same and projecting from the delivery end thereof, an apron composed of an endless sheet of flexible material 160, endless sprocket chains 157 passing over suitable drums or wheels, transverse strips 159 secured between said material and chains, hooks 156 secured to said strips and passing between the teeth formed in the plate 155, and pins 161 also secured to said strips and arranged in close proximity to the said hooks, substantially as set forth.

32. In an orange wrapping machine, the combination of the frame 1, plates 150 secured thereto, openings 151 formed in said plates, a suitable conveyer and a pin 152 passed through said openings for holding the conveyer at a suitable inclination, substantially as set forth.

In testimony whereof I affix my signature in the presence of two witnesses.

JAMES H. GOODBAR.

Witnesses:
JAMES J. O'DONOHOE,
EMIL STAREK.